UNITED STATES PATENT OFFICE.

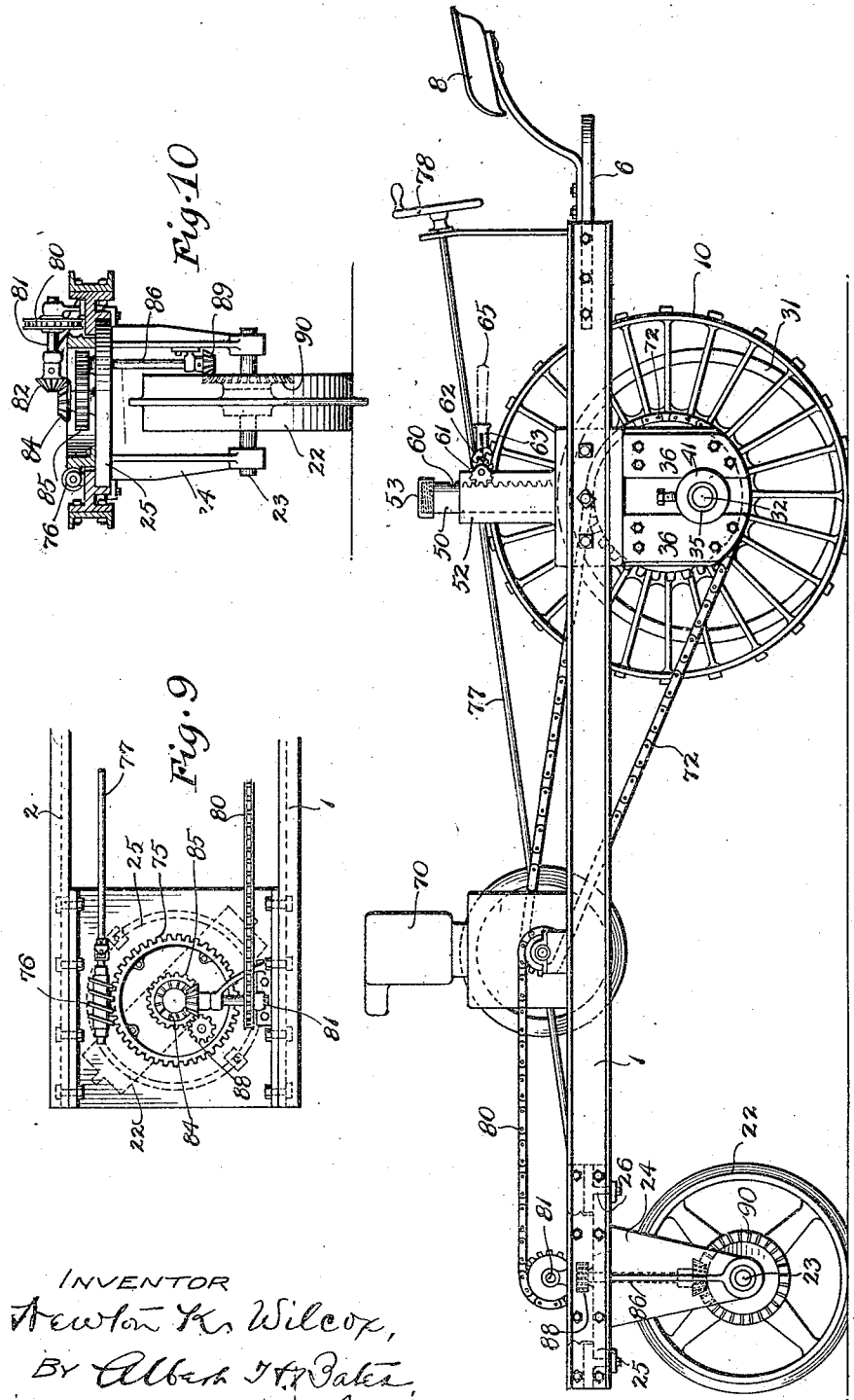

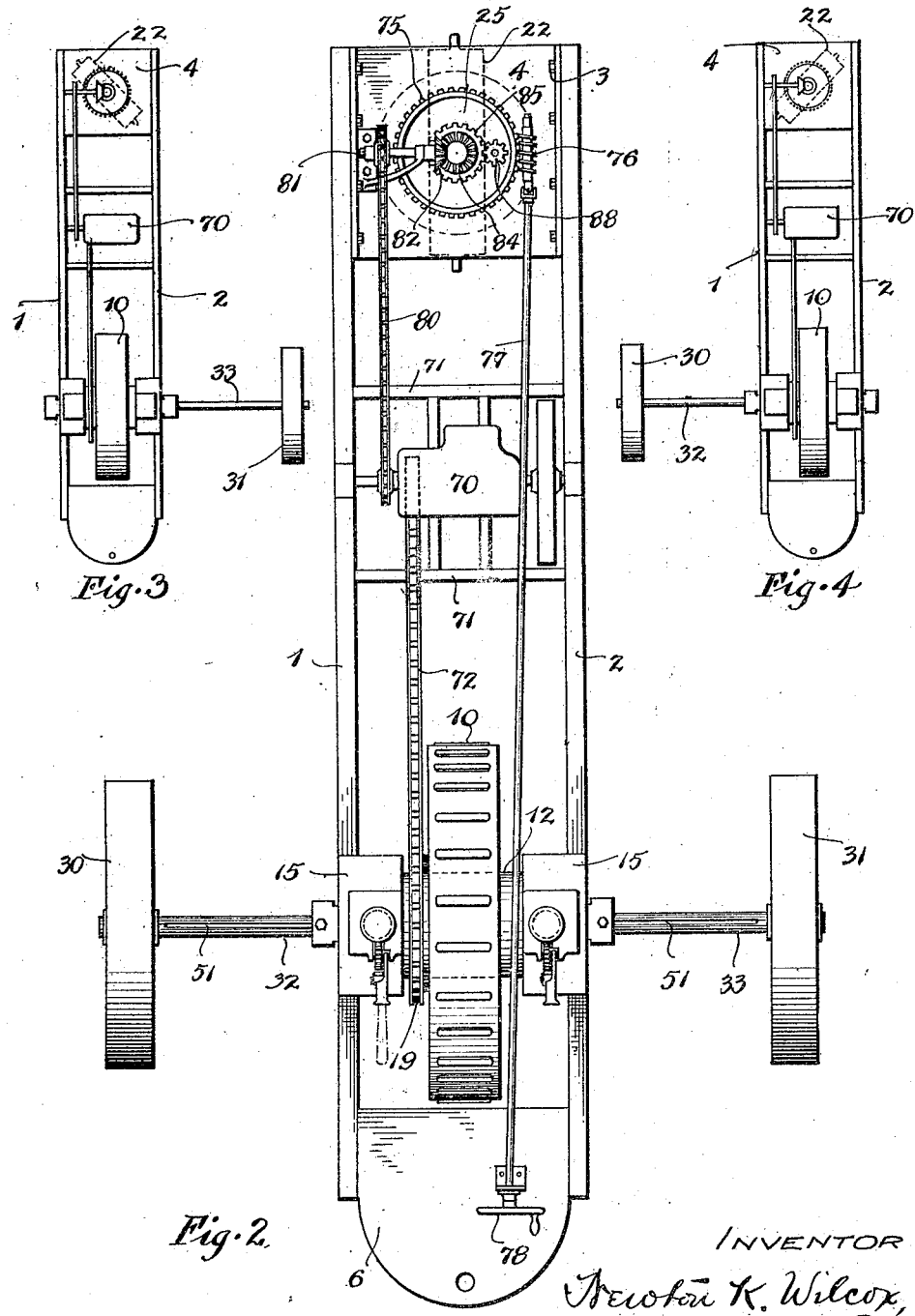

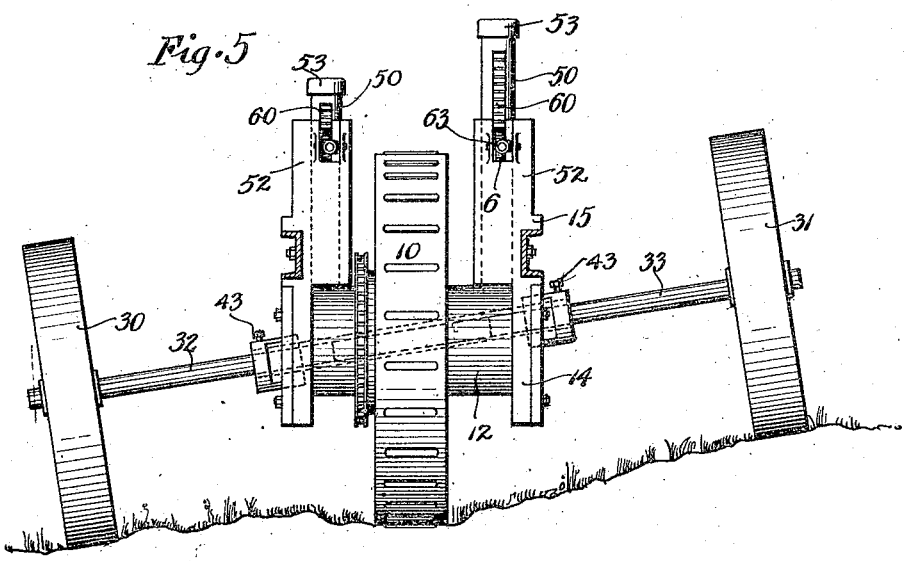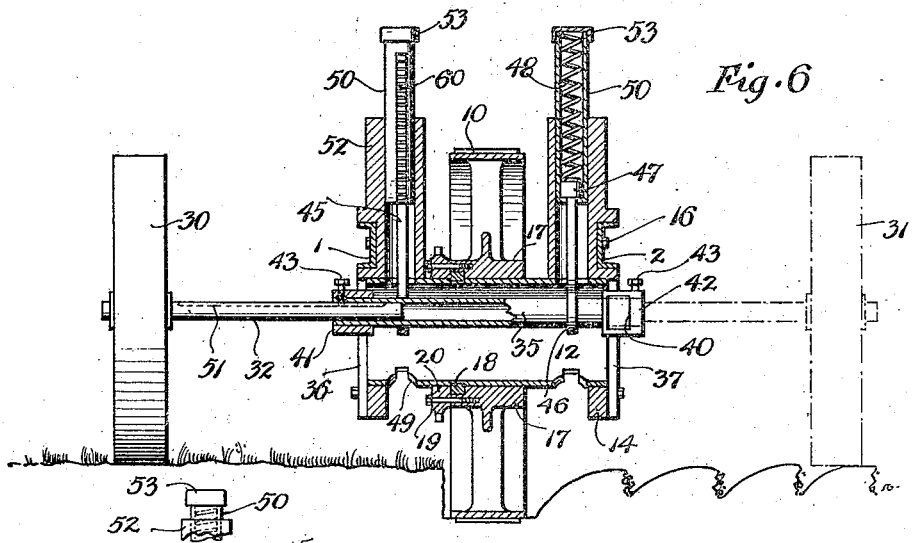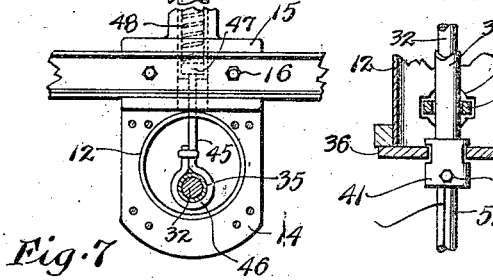

NEWTON K. WILCOX, OF PROVIDENCE, RHODE ISLAND.

TRACTOR.

1,242,500. Specification of Letters Patent. Patented Oct. 9, 1917.

Application filed May 25, 1916. Serial No. 99,734.

*To all whom it may concern:*

Be it known that I, NEWTON KINCAID WILCOX, a citizen of the United States, residing at Providence, in the county of Providence and State of Rhode Island, have invented a certain new and useful Improvement in Tractors, of which the following is a full, clear, and exact description, reference being had to the accompanying drawings.

This invention relates to tractors such as are used for agricultural purposes, and the general object is to provide a simple efficient tractor adaptable for a great variety of conditions and suitable not only for agricultural purposes, but so constructed that it may be very conveniently operated and thus very useful for drawing heavy loaded vehicles along roadways and streets.

More specific objects are to provide a tractor which may be caused to maintain its normal upright position on hillsides or uneven ground as well as on level ground; the provision of convenient steering means and the arrangement of wheels whereby the tractor may be turned in a very narrow space; to so arrange the tractor wheels that the distance between their paths may be varied to allow for the clearing of intermediate obstructions.

In carrying out my invention I provide a suitable frame, narrow in comparison to its length, mainly supported on two alined wheels one of which is the driving or traction wheel and the other steering wheel preferably also power driven. The frame carries a suitable motor and driving mechanism connecting the motor with the traction wheel and with the steering wheel. To maintain the tractor thus supported on alined wheels in its normal upright position I provide extensible axles in lateral or axial alinement with the traction wheel, which are capable of vertical adjustment and automatic yielding movement with relation to the traction wheel. These axles are provided at their outer ends with wheels which may be moved laterally toward and away from the traction wheel to vary the width of the tread. For many purposes it is desirable to use only one of these outstanding wheels at a time. Accordingly, another object of my invention is the arrangement of means for mounting the axle for these outstanding wheels so that the use of either may serve to hold the tractor in its normal upright position as well as permitting the automatic adaptation to conditions above described.

Some of the advantageous results accomplished by my invention are that the longitudinally alined wheels may run in a very narrow row or path, permitting the vehicle to pass between rows of growing crops while either or both of the outstanding wheels may run in adjacent parallel rows without coming in contact with the intervening plants; the omission of either stabilizing wheel permits the tractor to be used for pulling cultivating implements close to fences, rows of trees, stumps and the like at either side of the alined wheels while the traction wheel being in alinement and mounted in a rigid frame, provides for very convenient attachment, of any implement to be drawn by the tractor, at points providing substantially a direct pull securing the most efficient use of the tractor's power, as well as allowing the tractor to be most effectively steered. The adjustability of the stabilizing wheels and the alinement of the supporting wheels provides great convenience when the tractor is used for plowing, as it permits the longitudinally alined wheels to run in the open furrow.

My invention is hereinafter more fully described in connection with the accompanying drawings. In the description other objects and advantageous features will become apparent, and the essential characteristics are set forth in the claims.

Referring to the drawings, Figure 1 is a side elevation of my tractor; Fig. 2 is a plan of the same; Figs. 3 and 4 are conventional plans on a reduced scale illustrating the use of the tractor with a stabilizing wheel omitted either at one side or the other; Fig. 5 is a rear elevation of the tractor illustrating its use on uneven ground; Fig. 6 is a vertical section taken along the axis of the traction wheel illustrating the relative position of the parts when the traction wheel is at a lower level than the outstanding wheel or wheels; Fig. 7 is a detail of a portion of the mechanism connecting the floating axle for the outstanding wheels with the frame; Fig. 8 is a sectional detail of the same, the section being taken on the horizontal axial plane; Fig. 9 is a plan of the steering mechanism and means for driving the steering wheel; and Fig. 10 is a vertical transverse section through the frame parts above the steering wheel showing the steering wheel and means for driving the same in elevation.

Referring to the drawings, a frame of my tractor is preferably a long narrow structure comprising two longitudinal side members 1 and 2 secured at their forward ends by bolts 3 to vertical flanges on a transverse plate 4, which serves to support the forward end of the frame on the steering wheel and carries the steering mechanism and means for driving such wheel as will be hereinafter described. At the rear of the frame the side members 1 and 2 are bolted to a transverse plate 6 bracing these members and providing a platform for the operator, and which is shown as carrying a suitable seat indicated at 8 in Fig. 1.

Near the rear portion of the frame and between the side members is mounted a traction wheel 10 rotatably carried on a large hollow cylindrical transverse bearing 12, the ends of which are rigidly secured in depending portions 14 of bracket members 15 having outwardly facing grooves or cavities embracing the side members 1 and 2, and secured thereto by suitable bolts indicated at 16. The hub 17 of the tractor wheel rotatably embraces the cylindrical bearing 12 and is secured against lateral displacement by a ring 18 seating in an annular groove in the outer surface of the drum. This ring fits into a rabbet in the hub 17 of the traction wheel, the wheel being held in engagement with this ring by screws 19 extending through a sprocket wheel 20, which also rotatably embraces the axial drum and engages the outer side of the ring 18. This construction is merely illustrative of any suitable means for rotating this wheel and positioning it against lateral displacement.

The steering wheel indicated at 22 is mounted on an axle 23, the ends of which have bearings in the lower ends of bracket arms 24 depending from a substantially horizontal plate 25 rotatably engaging the under side of the plate 4 and positioned by a depending flange 26. This steering wheel is adapted to have its plane of rotation changed by any suitable steering mechanism to be hereinafter described, but in the normal running its path is substantially in the middle of the path of the traction wheel 10.

Substantially all of the weight of the frame, driving mechanism, etc., of my tractor is supported on the two alined wheels 10 and 22. Accordingly, to maintain the tractor in its normal upright position I provide wheels 30 and 31 each rotatable on the outer end of axle arms 32 and 33 respectively. These axle arms have a telescoping engagement with a hollow bodily movable or "floating" axle member 35 extending through the axle 12. The axle member 35 is prevented from longitudinal displacement while being permitted to move vertically with relation to the cylinder 12 or tipped so that its axis is at an angle to the axis of the cylinder. As a means for accomplishing this I have provided at the ends of the cylinder 12, a pair of spaced-apart vertical guides 36 and 37 at the opposite ends of the cylinder and secured to the brackets 15 by suitable bolts. These guides are engaged by comparatively wide vertical notches on opposite sides of enlarged portions 41 and 42, rigidly carried on the ends of the axle member 35.

To so connect the floating axle 35 with the frame of the tractor that the wheels 30 and 31 may serve to stabilize or maintain the upright position of the tractor and still permit either or both of the wheels 30 or 31 to run on a different level of ground from that of the tractor wheel, I have shown rods 45 each having a loop 46 loosely embracing the exterior of the hollow axle 35, extending upwardly through openings in the outer side of the cylinder 12 and provided at their upper ends with plungers 47, slidably embraced by vertically movable cylinder members 50, carried in vertical bores provided in upward extensions 52, shown as integral with the brackets 15. The cylinders 50 are provided with openings at their lower ends through which the plunger rods may slide and are closed at their upper ends by removable caps 53, and a spring 48 is carried in each of these cylinders 50 having its upper end engaging the cap 53 and its lower end acting downwardly on the plunger 47.

The position of the cylinders 50 is ordinarily such that the wheels 30, 10 and 31 may all run on the same level, but it will be seen from Figs. 5 and 6 that these cylinders may be raised or lowered so that the relative level on which either or both of the wheels 30 or 31 may run may be materially different from that of the traction wheel, and still these wheels may both serve to maintain the upright position of the tractor.

For convenience in assembling the axle 35, plungers and rods 45, the enlarged portions 41 and 42 are removably secured to the axle 35 by screws 43. These permit the axle to be removed longitudinally out of engagement with the loops 46 of the rods 45, whereupon the rods and cylinders may be removed bodily through openings 49 in the lower side of the hollow axle 12. The cylinders are permitted to pass through the brackets 15 by merely removing the caps 53. The axles 32 and 33 are each preferably provided with a longitudinal groove or keyway 51, in the upper side, adapted to be engaged by the screws 43 by which they are secured in any position given them. The inner ends of these grooves terminate short of the inner ends of the axles providing a shoulder preventing the drawing of the wheel too far and entirely removing it from the axle inadvertently, it being necessary to turn the screw 43 upwardly more than the usual distance for adjusting the position of the axle, in order to permit the complete removal of these axles.

The manner in which the parts just described operate and the method of adapting these parts for various conditions is as follows: Assuming first that both wheels 30 and 31 are mounted in position and the cylinders 50 are adjusted so that these wheels and the traction wheel are running substantially on the same level, if the tractor starts to tip in either direction, it immediately encounters the action of the spring 48 acting downwardly on its plunger which through the rod 45 resists relative upward movement of the corresponding end of the axle member 35. At the same time the wheel on the opposite side of the tractor acts by its weight to pull downwardly on the other end of the axle member 35, which in turn transmits this pull through the adjacent rod 45, plunger 47, to the lower end of the cylinder member 50 thereby arresting the tipping movement of the tractor. The action of one of the springs 48, compressed by such tipping movement, tends to bring the tractor back to its normal upright position.

Thus we have two elements serving to stabilize the tractor, namely the action of the compression springs and the weight of the wheel at the side of the tractor counteracting the tendency to rise.

A third important element in stabilizing the tractor is that if the tractor tips in either direction, say for example toward the wheel 30, the entire frame, cylindrical axle 12 and traction wheel 10 move as a unit, thus slanting the normally vertical plane of the wheel 10 toward the wheel 30. This in addition to the operations above described, tends to shift the axle of the wheels 30 and 31 longitudinally toward the wheel 30, by reason of the members 36 engaging the guide notches in the members 41 and 42 with a result that if the tractor does tip any material distance, the wheel 30 is necessarily shifted bodily from the path of the traction wheel. This lateral shifting of the wheel 30 requires considerable force by reason of its weight causing great friction on the ground, and accordingly, the tipping movement of the tractor is promptly arrested. The effectiveness of this function of the wheels 30 and 31 may be increased by providing sharp outer edges or projections on these wheels, which actually dig into the ground consequent upon such shifting.

It is obvious that the above action would take place if the tractor tends to tip in the opposite direction, and the combined effect of the three stabilizing forces (namely, the springs 48, the friction of the lateral shifting of one of these wheels and the weight of the opposite wheel) quickly arrests the tipping movement and the springs promptly return the tractor to its normal upright position, where the forces of these springs are substantially balanced.

If only one of the wheels 30 or 31 is used, which is very frequently the case, we have only two of the above named stabilizing forces operating at one time, that is, if the tractor tips toward the outer wheel we have the action of the springs and the friction of the lateral shifting of such wheel, and if it tips away from the same we have the springs and the weight of such wheel.

In order that the outer wheel or wheels may run on a different level and still perform their stabilizing functions it becomes necessary under many conditions to change the position of the axis of such stabilizing wheels with relation to the axis of the wheel 10 which may be accomplished by raising or lowering the cylinder members 50, as desired. For example, if the tractor is being used on a hill side or sloping roadway, as illustrated in Fig. 5, one of the cylinders 50 may be raised and the other lowered and held in such position by any suitable means, thus bringing one of the stabilizing wheels above the path of the wheel 10 and the other below it. As a convenient means for raising and lowering the cylinders 50 I have shown a rack 60 on the rear side of each of these cylinders 50 engaged by a pinion 61 adapted to be operated by a ratchet pawl 62 carried on a pivoted lever 63 which may be vertically oscillated for raising and lowering the cylinders (after the manner of well known lifting jacks) by inserting a suitable movable lever indicated in Fig. 1 at 65.

The stabilizing functions above described may be performed with one wheel on a hillside as well as on a level. Thus, if in the position shown in Fig. 5, the wheel 31 is not used, the wheel 30 will serve to maintain the stability of the tractor serving by the springs and its friction to prevent the tractor tipping toward the same and by its weight and the springs to prevent tipping away from this wheel.

It has been previously set out that the tipping of the tractor tends to cause lateral shifting of the stabilizing wheel which shifts only with difficulty, thereby resisting the tipping. I have found that in view of this result of the construction shown, the springs 48 may be entirely omitted, if desired, and, under a large number of conditions, the members 45 connecting the springs and floating axle may also be omitted.

When the tractor is used for plowing purposes it is desirable to have the steering and traction wheel run in the open furrow with one or both wheels 30 and 31 on the level above the same. I have found in practice that it is preferable to use only one stabilizing wheel, as shown in full lines in Fig. 6, although the other may be used, as indicated in broken lines. When the tractor is used under these conditions, it is desirable to shift the axis of the stabilizing wheel upwardly which is accomplished by bodily raising the member 35, by raising the cylinders 50 to substantially the same level, by means of the mechanism described.

At 70 is indicated a motor of any suitable construction mounted on cross members 71 secured to the frame members 1 and 2. This motor is preferably connected with the traction wheel 10 by any suitable driving mechanism, shown as including a chain 72 which runs over the sprocket wheel 19, heretofore described. Such driving mechanism may include change speed gearing, reversing mechanism, braking systems, etc., not shown.

As heretofore stated, the steering wheel is carried in a revoluble bracket engaging the plate 4, and as a means for rotating this bracket in either direction for steering I have shown a worm gear 75 provided on an upwardly extending flange rigid with the plate 25 and shown as engaged by a worm 76 operated by a suitable rod 77, adapted to be rotated by a hand wheel 78 adjacent the driver's seat.

In turning sharply, it is frequently necessary to rotate the steering wheel by driving mechanism connected with the engine. Such driving mechanism is illustrated in the drawings as including a chain 80 leading from the engine to a short shaft 81 having a suitable sprocket wheel driven by the chain. The inner end of this shaft is provided with a bevel gear 82 meshing with a corresponding bevel gear 84 rigid with a spur gear 85. The gears 84 and 85 are rotatably carried on a suitable stud rising from the plate 25. Extending downwardly from this plate is a shaft 86, having a pinion 88 rigid with its upper end and meshing with the gear 85, and at its lower end a bevel pinion 89 meshing with a bevel gear 90 rigid with the steering wheel 22. It will be noted that regardless of the position of this wheel the driving connection between the engine, and the steering wheel is provided which may rotate the same in either direction.

The reversing may be accomplished by suitable clutch mechanism adjacent the engine, or the steering wheel may be driven in opposite directions by so turning its plane of rotation, that the shaft 86 and gear 90 stand on one side or the other of its direction of movement.

By the steering arrangement above described, I may turn the tractor in a very narrow space, in fact the wheel 22 may be turned with its plane of rotation at right angles to that of the traction wheel and by clutching its driving mechanism with the engine, may be caused to rotate in either direction, turning the frame about the point on which the traction wheel stands as a center either to the right or to the left.

From the foregoing description it will be apparent that I have provided a simple efficient tractor, which is adapted for a very wide variety of conditions, which may be used in almost every circumstance where horses are now used, and more effectively owing to its superior power and other obvious advantages. Owing to its convenience in operation, it is further useful as an element in hauling heavy loads on vehicles drawn behind the same. The construction and operation of the stabilizing wheels is such that the three axially alined wheels may always be in contact with the ground regardless of unevenness, and either or both of the stabilizing wheels may rise over high portions of the ground, while the springs acting on the floating axle will permit the tractor wheel to remain in contact with the ground and rest thereon with sufficient weight to provide traction at all times. The tractor is equally well adapted for slanting or uneven country roads and city pavements as well as uneven or level ground on which it is used as an agricultural implement.

If desired, vertically offset portions may be provided in the axles 32 and 33 for the clearing of obstructions between the paths of the alined wheels and either of the stabilizing wheels. This feature is fully shown, described and claimed in my prior application on tractors, filed December 27, 1915, Serial No. 68,640.

Having thus described my invention, what I claim is:

1. In a tractor, the combination of a frame, alined wheels adapted to run in the same path and acting to support the frame, a stabilizing wheel positioned at one side of the tractor, an adjustable extensible member on which said wheel is journaled substantially in axial alinement with one of the first mentioned wheels.

2. In a tractor, the combination of a frame, a pair of supporting wheels adapted to run substantially in the same path, a removable laterally extending member, a stabilizing wheel journaled on said member, and means for securing said member to the frame with the wheel at either side of the tractor, said means permitting its vertical movement with relation to the frame.

3. In a tractor, the combination of a frame, supporting wheels adapted to run in substantially the same path, a stabilizing wheel laterally separated from the frame, an axle for the stabilizing wheel, a member connecting the axle with the frame, means pivotally coöperating with said member permitting the angle of such axle to change with relation to the frame and also permitting the vertical movement of said member with relation to the frame at its pivotal connection.

4. In a tractor, the combination of a frame, driving and steering wheels supporting said frame and arranged to run in the same path, a laterally extending axle member substantially in axial alinement with one of said wheels, a stabilizing wheel journaled on said member at a point separated from the path of the first mentioned wheels, means for holding said axle member at either side of the frame, and means acting as the holding means for vertically adjusting the position of the last mentioned wheel with relation to the path of the others.

5. In a tractor, the combination of a frame, wheels supporting said frame and arranged to run in the same path, one of said wheels having a hollow bearing member secured to the frame, a laterally positioned stabilizing wheel, an axle therefor extending inside of said bearing and movably connected with the frame.

6. In a tractor, the combination of a frame, a plurality of wheels supporting said frame and arranged to run in the same path, one of said wheels having a hollow bearing member secured to the frame, a laterally positioned stabilizing wheel, an axle therefor extending inside of said bearing, and means connecting the same with the frame permitting vertical movement of said axle member relative to the frame.

7. In a tractor, the combination of a frame, a plurality of wheels supporting said frame and arranged to run in the same path, one of said wheels having a hollow bearing member secured to the frame, a laterally positioned stabilizing wheel, an axle therefor extending inside of said bearing member, and guides slidably engaging said axle at separated points permitting a vertical movement while preventing lateral movement.

8. In a tractor, the combination of a frame, a steering wheel and traction wheel substantially in longitudinal alinement, a hollow bearing member for said traction wheel secured to the frame, a stabilizing wheel laterally positioned from the frame, an axle member therefor extending inside said hollow member, guides permitting a vertical movement of said axle, and separated yielding means connecting said axle with the frame and tending to maintain a given position of said axle with relation to the frame.

9. In a tractor, the combination of a frame, a steering wheel and traction wheel substantially in longitudinal alinement, a hollow bearing member for said traction wheel secured to the frame, a stabilizing wheel laterally positioned from the frame, an axle member therefor extending inside said hollow member, yielding means connecting said axle with the frame and tending to maintain a given position of said axle with relation to the frame, and means for adjusting the normal position of said axle relative to the frame.

10. In a tractor, the combination of a frame, longitudinally alined supporting wheels therefor, a stabilizing wheel approximately in axial alinement with one of the longitudinally alined wheels, an extensible axle for the stabilizing wheel, and means for removably securing said stabilizing wheel in position.

11. In a tractor, the combination of a frame, longitudinally alined supporting and steering wheels therefor, a stabilizing wheel, an axle therefor, means for removably securing said axle to the frame with its stabilizing wheel at either side thereof, said means being positioned to hold the axle and stabilizing wheel with its axis substantially in the same vertical plane as the axis of the driving wheel.

12. In a tractor, the combination of a plurality of alined supporting wheels, a narrow frame connecting the wheels, an axle member extending transversely of one of said wheels substantially concentric therewith terminating closely adjacent the sides of the frame and adapted to be vertically adjusted or tipped in either direction with relation to the frame, removable extensions for said axle member, and a stabilizing wheel alone sufficient to stabilize the tractor journaled at the outer end of each of said extensions.

13. In a tractor, the combination of a plurality of alined supporting wheels, an axle member extending transversely through one of said wheels substantially concentric with such wheel, means connecting said member with the frame including yielding means permitting relative movement and having devices whereby the axle may be vertically adjusted or tipped in either direction with relation to the frame, an extension for said axle member, and a stabilizing wheel journaled at the outer end of said extension.

14. In a tractor, the combination of a frame, longitudinally alined steering and traction wheels supporting the frame, a comparatively large hollow bearing member for the traction wheel secured to the frame, a transverse axle member inside said hollow member, a lateral extension for said axle, a stabilizing wheel journaled on said extension, means for adjusting the relative position of the axle and frame, and means for preventing the relative lowering movement of either end of said axle member with relation to the frame beyond the predetermined point, adjustable means for determining said point.

15. In a tractor, the combination of a frame, longitudinally alined steering and traction wheels supporting the frame, a comparatively large hollow bearing member for the traction wheel secured to the frame, a transverse axle member inside said hollow member, lateral extensions for said axle, a stabilizing wheel journaled on each of said extensions, means for adjusting the relative position of the axle and frame, means for preventing the relative lowering movement of either end of said axle member with relation to the frame beyond the predetermined point, adjustable means for determining said point, and means for preventing longitudinal displacement of said axle member whereby when the tractor tips in either direction one of said yielding means, the friction of one of said wheels and the weight of the other may tend to arrest the tipping and cause the frame to resume its normal position.

16. In a tractor frame, the combination of longitudinally alined traction and steering wheels, independently controllable driving means connected with each of said wheels, a laterally extending axle member in axial alinement with the traction wheel, a stabilizing wheel journaled thereon, and means for turning the plane of rotation of the steering wheel.

17. In a tractor frame, the combination of longitudinally alined traction and steering wheels, means for driving said traction wheel, a laterally extending axle member in axial alinement with the traction wheel, a stabilizing wheel journaled thereon, means for turning the plane of rotation of the steering wheel to a position transverse to its normal path, and a separately controllable means for driving the steering wheel while in any position.

18. The combination of a long narrow frame, a traction wheel journaled near one end thereof and supporting the frame, a steering wheel at the other end of the frame and supporting the same, said steering wheel being adapted to be turned entirely around in either direction, a stabilizing wheel, an axle therefor movably connected with the frame and in substantial alinement with the axis of the traction wheel, means for securing the same in position at either side of the frame, means for driving the traction wheel, and independently controllable means for driving the steering wheel.

19. In a tractor, the combination of a frame, steering and traction wheels in longitudinal alinement, a hollow bearing member for said traction wheel secured to the frame, an axle member mounted within said bearing member, an extension for said axle member and a stabilizing wheel mounted on said extension, members embracing the axle member at separated points, springs engaging said members, and means carrying the springs adapted to be vertically adjusted with relation to the frame.

20. In a tractor, the combination of a frame, traction and steering wheels in alinement, a hollow bearing member for said traction wheel secured to the frame, a stabilizing wheel, an axle journaled thereto and extending toward said hollow bearing member, an axle member adjustably connected with the stabilizing axle mounted within the hollow bearing member, substantially vertical guides engaging the end of said axle member and permitting up and down movement while preventing longitudinal displacement, and springs tending to maintain a given position of said axle member with relation to the frame.

21. In a tractor, the combination of a frame, traction and steering wheels in alinement, a hollow bearing member for said traction wheel secured to the frame, a stabilizing wheel, an axle journaled thereto and extending toward said hollow bearing member, an axle member adjustably connected with the stabilizing axle mounted within the hollow bearing member, substantially vertical guides engaging the end of said axle member and permitting up and down movement while preventing longitudinal displacement, springs tending to maintain a given position of said axle member with relation to the frame, plungers connecting said springs and axle member, and vertically adjustable devices for slidably receiving said plungers.

22. In a tractor, the combination of a frame, a steering and traction wheel in alinement, a comparatively large hollow bearing member for the traction wheel having its end secured to the frame and rotatably embraced by said wheel at the intermediate portion, stabilizing wheels adapted to be positioned at each side of the frame, an axle within the hollow bearing member having extensible members journaled to the stabilizing wheels, members embracing the axle member at separated points extending upwardly, plungers on the upper ends of these members, cylinder members embracing the plungers and springs acting downwardly on the plungers, and devices operating on each of these cylinder members for raising and lowering the same to change the position of said axle with relation to the frame.

23. In a tractor, the combination of a frame, longitudinally alined wheels supporting the frame, a stabilizing wheel, an axle for the stabilizing wheel connected with the frame, and means tending to prevent the tipping of the frame by friction including a vertically slidable pivotal connection between the axle and frame, said connection acting to prevent longitudinal movement of the axle with relation to the frame.

24. In a tractor, the combination of a frame, alined supporting wheels therefor, a laterally separated stabilizing wheel, an axle member for the stabilizing wheel mounted transversely of the frame, and means for movably securing the axle to the frame at separated points while permitting a change of the angle of the axle relative to the frame, said means including members for preventing longitudinal shifting of said axle member relative to the frame.

25. In a tractor, the combination of a comparatively long narrow frame, longitudinally alined wheels supporting the frame, a stabilizing wheel, an axle therefor extending across the plane of the alined wheels and terminating adjacent the sides of the frame, an axle extension on which the stabilizing wheel is journaled, means for removably connecting said axle to the frame.

26. In a tractor, the combination of a frame, a driving and steering wheel supporting the frame, independently controllable driving means connected with each of said wheels, whereby they may be driven simultaneously or independently, a stabilizing wheel, and means for connecting said stabilizing wheel with the frame with its axis substantially in the same vertical plane with the axis of said driving wheel.

In testimony whereof, I hereunto affix my signature.

NEWTON K. WILCOX.